Oct. 2, 1951 G. A. CHISSOM ET AL 2,569,656
APPARATUS FOR TREATING THE CONTENTS OF CLOSED CONTAINERS
Filed Oct. 2, 1948 2 Sheets-Sheet 1
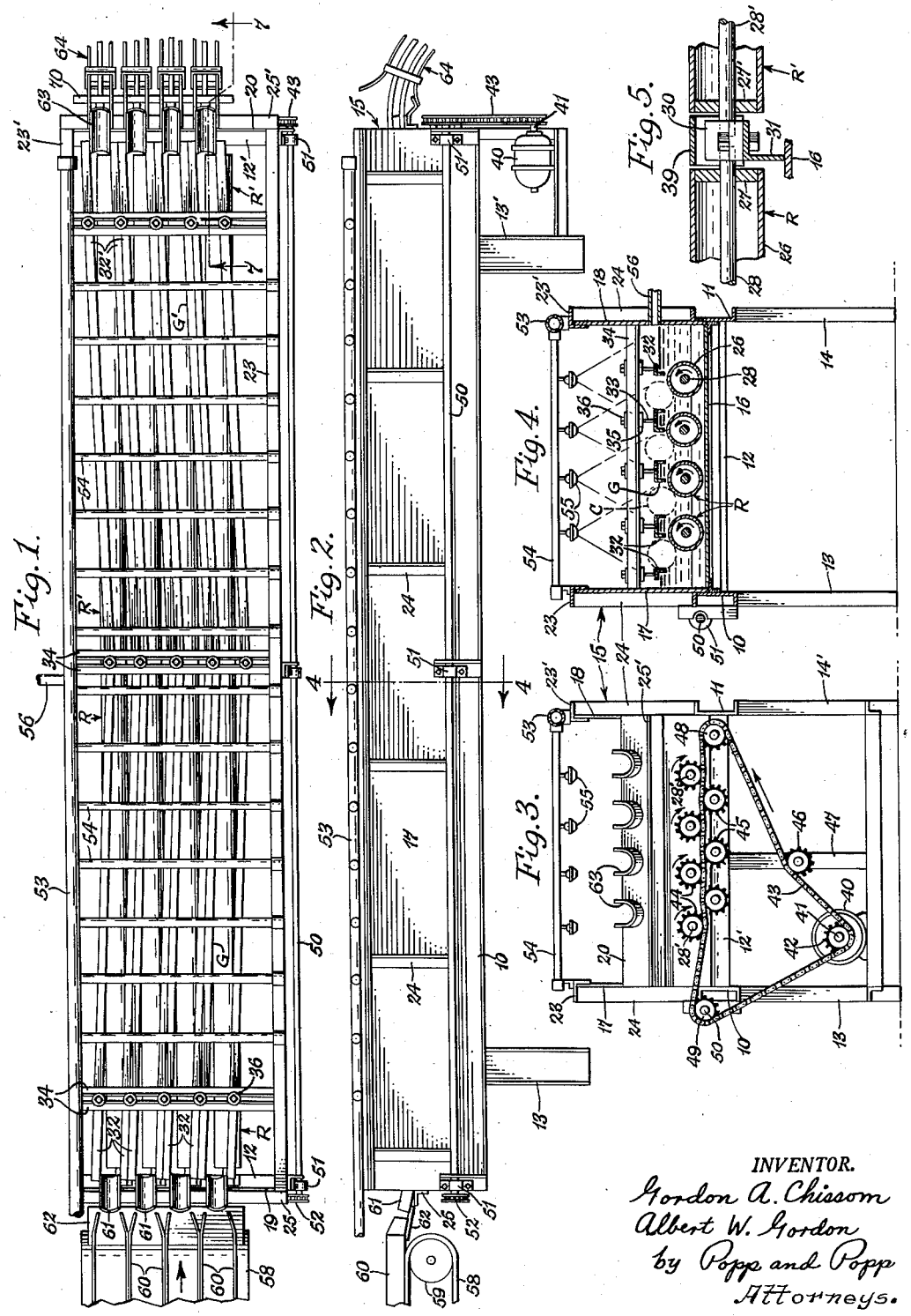
INVENTOR.
Gordon A. Chissom
Albert W. Gordon
by Popp and Popp
Attorneys.

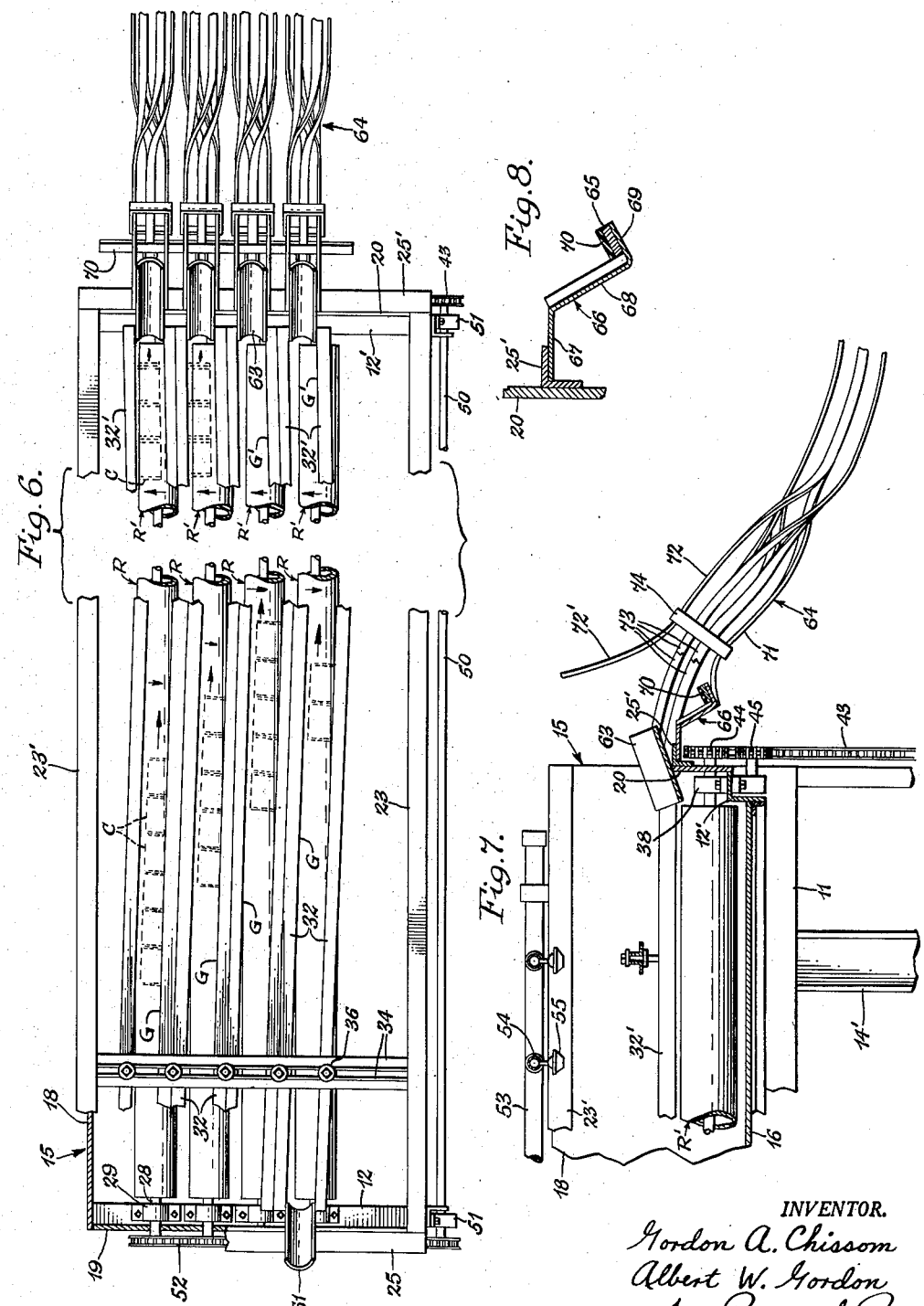

Patented Oct. 2, 1951

2,569,656

UNITED STATES PATENT OFFICE 2,569,656

APPARATUS FOR TREATING THE CONTENTS OF CLOSED CONTAINERS

Gordon A. Chissom and Albert W. Gordon, Leesburg, Fla.

Application October 2, 1948, Serial No. 52,464

16 Claims. (Cl. 99—360)

1

This invention relates to improvements in apparatus for treating the contents of closed containers, and more particularly to apparatus for treating comestibles in closed cylindrical containers.

It is well-known that various comestibles are marketed in closed metal containers, generally called cans, which for practical reasons are cylindrical in form and are commercially used in various sizes. In canning certain comestibles it is conventional practice to fill the cans, hermetically seal and thereafter cool or heat the contents of the cans, the type and extent of such treatment depending upon the nature of the particular comestible being processed.

It is the primary object of the invention to provide apparatus which effects a rapid change in the temperature of the contents of closed cylindrical containers or cans.

Another important object is to provide such apparatus which operates to effect a uniform change in temperature throughout the contents of the can.

A further important object is to provide such apparatus which is continuous in operation and is adapted to treat a continuous procession of cans.

Another object is to provide such apparatus which subjects all cans and their respective contents to a similar treatment for a predetermined length of time.

Another object is to provide such apparatus which has commercial capacity and is adapted to handle the rate of cans discharged by a commercial high speed can sealing machine whereby the apparatus can be arranged in the production line to receive directly the line of cans discharged by the sealer.

Another object is to provide such apparatus which takes up little floor space.

A further object is to provide such apparatus which handles the cans without deforming or otherwise damaging them.

A further aim is to provide such an apparatus which is simple and compact in construction, relatively inexpensive to manufacture and not likely to get out of order or require repairs.

To illustrate the applicability of the invention, an embodiment thereof which is particularly adapted for cooling canned fruit juices is fully disclosed in the accompanying drawings and the following detailed description. In canning orange or grapefruit juice, for example, it is conventional practice to preheat the juice to a temperature of about 200° F. before placing it in the

2 cans. After the cans are filled with the preheated juice they are sealed and thereafter processed so as to cool relatively rapidly the canned juice to room temperature or slightly above. Preheating the fruit juice is desirable in order to preserve its flavor and the subsequent cooling of the juice in the can prevents the juice from becoming discolored which condition of discoloration would take place if the canned juice were allowed to cool slowly. Such a discolored condition is frequently referred to in the art as "stack burn."

In the accompanying drawings:

Fig. 1 is a top plan view of a can cooler embodying the present invention and showing this cooler operatively associated with can feeding and can discharging devices, these devices being fragmentarily illustrated.

Fig. 2 is a side elevational view of the can cooler shown in Fig. 1 and viewed from the lower side of the cooler as illustrated in Fig. 1.

Fig. 3 is an elevational view of the discharge or right hand end of the can cooler shown in Fig. 2, the can discharging device shown in Fig. 2 being omitted.

Fig. 4 is a vertical transverse sectional view taken on line 4—4, Fig. 2.

Fig. 5 is an enlarged fragmentary view extending longitudinally of the can cooler and illustrating the manner in which the opposing ends of one pair of coaxial rollers, shown in Fig. 1, are journaled.

Fig. 6 is a fragmentary view similar to Fig. 1, on an enlarged scale, with various portions of the apparatus broken away to expose other parts, the piping of the spray cooling system and the can feeding device being completely omitted in Fig. 6.

Fig. 7 is an enlarged fragmentary sectional view taken generally on line 7—7, Fig. 1.

Fig. 8 is an enlarged vertical central sectional view of the device shown in Fig. 7 for causing the cans discharged from the can cooler to bounce into a can conveying device.

The can cooler is shown as having a frame of any suitable construction although the frame is preferably fabricated of standard structural members such as angle bars and channel members welded together to provide a rigid and unitary structure. As shown, the frame includes a pair of transversely spaced and parallel longitudinal channels 10 and 11 horizontally arranged and connected at their corresponding ends by horizontal transverse angle bars 12 and 12' to form an elongated rectangular frame base supported on the floor by two pairs of channel legs 13, 13' and 14, 14' connected to the channels 10 and 11 respectively.

An elongated tank 15 is suitably supported on this rectangular frame base and is shown as comprising a bottom 16, side walls 17 and 18 and end walls 19 and 20. The bottom 16 is a rectangular sheet metal plate arranged between the channels 10, 11 and angle bars 12, 12' and is supported in a horizontal position on longitudinal and transverse angle bars 21 and 22, respectively, connected to these frame members. The side walls 17 and 18 are similar and each is in the form of an elongated rectangular plate arranged in a vertical plane and welded along its lower edge to the bottom 16 and respective longitudinal channel 10 or 11. The end walls 19 and 20 are similar and each is in the form of a rectangular plate welded to the corresponding vertical edges of the side walls 17 and 18 and also welded along its lower edge to the respective transverse angle bar 12 or 12'. The upper edges of these end walls 19 and 20 are shown as being arranged substantially below the upper edges of the side walls 17 and 18.

The tank 15 is shown as being reinforced by longitudinal angle bars 23, 23' extending along the upper edges of the side walls 17 and 18 respectively; a plurality of vertical angle bars 24 arranged at intervals along each longitudinal side of the tank and on the outside of the side walls 17 and 18 and interposed between the channels 10, 11 and respective angle bars 23, 23'; and horizontal transverse angle bars 25, 25' arranged on the outside of the end walls 19 and 20 respectively, and intermediate the upper and lower edges of these end walls.

The tank 15 is shown in Fig. 4 as holding or containing a body of heat exchange liquid, which in the illustrated embodiment of the invention is cold water, through which the cans of fruit juice are moved from one end of the tank toward the other end thereof in such manner as to effect a rapid and uniform cooling of the juice in the cans.

In accordance with the invention the cans are so moved through the tank 15 in heat exchange relation with the cold water therein by causing the cylindrical peripheries of the cans to frictionally engage a moving surface and maintaining the axes of the cans at an angle to the direction of movement of the moving surface such that a major component of the force imparted to the cans by engagement with the moving surface is normal to the axes of the cans and a minor component of this force is parallel with the axes of the cans whereby the cans are rotated about their axes and at the same time move axially. Thus the cans can be rotated rapidly or spun about their own axes so as to agitate their contents while the cans travel axially through a heat exchange zone. By arranging the cans end to end a line or procession of cans can be moved continuously through the cooling or heat exchange zone. Further, the capacity of the cooler can be increased by arranging a plurality of such lines of cans alongside one another.

In the embodiment of the invention illustrated in the drawings the movable surface described above is provided by cylindrical rollers. Referring to the drawings four elongated cylinders, each of which is represented by the letter R, are shown as horizontally and rotatably arranged longitudinally in the lower part of the tank 15 in transversely spaced parallel relation to one another. These rollers R are identical in form and in their side by side relation occupy the left hand half of the tank 15 as shown in Figs. 1 and 6 and are completely immersed in the body of cold water in the tank, as shown in Fig. 4. Each roller R is shown as comprising an elongated cylindrical tube 26 closed at each end by an end head 27 arranged within the tube and welded thereto. A central and coaxial shaft 28 extends completely through each roller R and each end of this shaft projects through a central opening provided in the corresponding end head 27, the shaft 28 being fast to the end heads 27. The outer end of each roller shaft 28 is journaled in a bearing 29 mounted on the transverse angle bar 12 and extends outwardly beyond this bearing through an opening provided in the end wall 19 of the tank 15, as shown in Fig. 6. This opening in the end wall 19 can be suitably sealed to prevent liquid in the tank 15 from leaking out around the shaft 28. The inner end of each roller shaft 28 is journalled in a bearing 30 mounted on an intermediate transverse angle bar 31 arranged on the upper surface of the bottom 16 of the tank 15 and secured at its ends to the side walls 17 and 18 of the tank.

Means are provided to maintain a line or procession of cans in end to end arrangement on each roller R with the axes of the cans arranged at a slight angle to the axis of the roller to effect the axial movement of the cans longitudinally along the roller while the cans are being rotated. For this purpose, a pair of horizontally spaced and parallel guide members in the form of elongated angle bars 32 are arranged horizontally above each roller R to provide a guideway G therebetween. The central longitudinal axis of each guideway G intersects at a slight angle a vertical projection of the axis of the corresponding subjacent roller R. The transverse width of each guideway G is slightly larger than the diameter of the cylindrical cans passing therethrough. Each of the guide bars 32 forming one side of a guideway G is shown as arranged with one flange horizontal and the other flange extending downwardly from the inner edge of the horizontal flange so that the opposing faces of a pair of adjacent guide bars providing a guideway G therebetween form the guide surfaces for this guideway. Referring to Fig. 4 the intermediate angle bars 32 are arranged and secured together as by welding to form channel members and, of course, integral channel members could be employed instead of the coupled angle bars for these intermediate guide members.

The guide bars 32 adjacent their opposite ends are rigidly suspended from an overhead structure which is shown as including a vertical hanger rod 33 for each outer guide bar and each pair of coupled intermediate guide bars. The lower end of each hanger rod 33 is suitably connected as by welding to the respective guide bar 32 and the hanger rods 33 extend upwardly between spaced support angle bars 34 which extend transversely of the tank 15 and are secured at their ends to the tank side walls 17 and 18. A collar 35 is fixed to each hanger rod 33 and arranged thereon so as to engage the lower surfaces of the support angle bars 34 and the upper end of each hanger rod is externally threaded to receive a nut 36 which can be screwed down against the upper surfaces of the support angle bars 34. With such a suspension arranged at both ends of the guide bars 32 it will be seen that the guide bars can be adjusted relative to the support angle bars 34 by loosening the nuts 36, shifting the hanger rods 33 along the space therebetween and again tightening the nuts 36 whereby the desired width and angularity of each guideway G can be provided. Referring to Figs. 1 and 6, the guide bars 32 are shown as arranged so that the central longitudinal axes of the guideways G are parallel and each guideway axis extends across the respective roller R from a point adjacent the upper side of the outer end of the roller to a point adjacent the lower side of the inner end of this roller, as viewed in these figures.

The rollers R are rotated in a counterclockwise direction as viewed in Fig. 4 or with the top surfaces of these rollers moving in the direction of the arrows in Fig. 6 and at a speed such that each of the cans C in a line of cans arranged in each guideway G (Fig. 6) will be rotated rapidly or spun about its own axis and at the same time the lines of cans will be caused to move relatively slowly along their respective guideways in the direction of the arrows illustrated in Fig. 6. By increasing the angularity of the guide bars 32 for any guideway G in a horizontal plane with respect to the axis of the corresponding roller R, the axes of the cans in this guideway will be disposed at a greater angle to the axis of the roller so that the line of cans will move faster along the guideway. On the other hand by decreasing the angularity of the guide bars with respect to the roller the line of cans between these guide bars will travel axially along the roller at a slower speed.

With the level of cold water in the tank 15 above the top surfaces of the rollers R, the cans in the guideways G are partially immersed in this water. In this manner cans in end to end arrangement can be fed into the flooded canways jointly provided by the rollers R and guide bars 32 whereby the cans due to their frictional engagement with the rollers R are caused to rotate about their axes to agitate their contents in heat exchange relation with the cold water and at the same time are caused to move along the guideways G toward the inner ends of the rollers. The rapid spinning of the cans in the cold water has been found very effective in producing a rapid and uniform change in the temperature of the fruit juices within the cans.

The time of treatment necessary to produce the desired temperature change in the contents of the cans depends upon the dimensional size and volumetric content of the cans, the initial temperature of the contents of the cans, the temperature of the cold water in the tank 15 and the roller speed. For a cooler with a given roller speed and a given number of guideways G and containing a body of cold water having a given temperature and in order to treat the cans for the necessary length of time to effect the desired temperature change in their contents and still maintain the desired output of cooled cans, it is necessary to increase the length of travel of the cans through the cold water in the tank beyond that provided by the length of the rollers R. This greater length of travel of the cans cannot be provided by merely lengthening the rollers R and the guide bars 32 since the angularity of the guide bars with respect to the rollers would then have to be decreased in order to position the lengthened guide bars operatively along the full length of the lengthened rollers. This decreased angularity between the lengthened guide bars and rollers would slow down the speed of longitudinal travel of the cans and hence decrease the output of the cooled cans or the capacity of the cooler.

In the illustrated form of the invention a greater length of travel for the lines of cans is shown as provided by arranging a second set of four rollers, each of which is represented by the letter R', in coaxial alinement and juxtaposition with the rollers R. The rollers R' occupy the right hand half of the tank 15 as viewed in Figs. 1 and 6. The rollers R' are similar to the rollers R and hence are represented by the same reference numerals except as distinguished by a prime. Thus each roller R' comprises an elongated cylindrical tube 26', end heads 27' and a shaft 28'. The shaft 28' of each roller R' is coaxial with the shaft 28 of the corresponding roller R and the inner end of the shaft 28' is journaled in the respective bearing 30. The outer end of each shaft 28' is journaled in a bearing 38 mounted on the transverse angle bar 12' and extends outwardly beyond this bearing through the end wall 20 in a manner similar to that for the outer end of any of the shafts 28 of the rollers R.

Referring to Fig. 5 a stationary substantially semi-circular bridge or guide 39 is arranged between the opposing ends of each pair of companion rollers R and R' and covers the corresponding bearing 30 and is suitably mounted on the intermediate transverse angle bar 31. Each stationary guide 39 of a radius equal to that of the rollers R and R' and is of such an axial length that the end faces of this guide are closely spaced to the opposing end faces of the rollers thereby to provide in effect a peripherially concentric although stationary extension of one roller into the other.

Angle bars 32' similar to the bars 32 are arranged above the rollers R' and provide guideways G'. The outer ends of the angle bars 32' are supported by a hanger rod assembly similar to that described for the angle bars 32 and the inner ends of the angle bars 32' are suitably connected to the hanger rods 33 supporting the inner ends of the angle bars 32. The can inlet or inner end of each guideway G' opposes the can outlet or inner end of the corresponding guideway G so that a continuous canway or guideway is provided between the outer ends of each pair of coaxial rollers R and R'. In view of this alinement of the opposing ends of companion guideways G and G' and since the rollers R and R' are coaxial, the guide bars 32' are inclined in a reversed relation to the inclination of the guide bars 32 and the rollers R' rotate in an opposite direction to the rollers R. Thus the guide bars 32' are arranged so that the central longitudinal axes of the guideways G' extend across their respective rollers R' from a point adjacent the lower side, as viewed in Figs. 1 and 6, of the inner ends of these rollers to a point adjacent the upper side of the other ends thereof. In other words the can inlet end of any one of either the guideways G or G' is adjacent the rising side of the respective rotating roller R or R'. The rollers R' are rotated in a clockwise direction as viewed in Fig. 3 or with the top surfaces of these rollers moving in the direction of the arrows in Fig. 6, lines of cans C illustrated in Fig. 6 being thereby compelled to move along their respective guideways G' in the direction of the arrows shown.

While any suitable means for rotating the rollers R and R' can be employed these rollers are shown as rotated in opposite directions by driving means which include an electric motor 40 arranged below the tank 15 and suitably supported on the frame of the cooler. The axis of the armature shaft 41 of the motor 40 is horizontal and extends longitudinally of the tank 15 with the outer end of this shaft projecting slightly outwardly beyond the vertical end wall 20 of the tank. A sprocket 42 is fast to the outer extremity of the armature shaft 41 and drives an endless chain 43. A driven sprocket 44 is fast to the outer extremity of each of the shafts 28' and an idler sprocket 45 is arranged below and between each pair of adjacent driven sprockets 44. The idler sprockets 45 are suitably journaled on the transverse angle bar 12' as shown in Fig. 7. As shown in Fig. 3, the endless chain 43 passes around the bottom of the drive sprocket 42; thence upwardly to the right over a first idler sprocket 46 suitably journaled on a strut 47 connected to the frame of the apparatus; thence around a second idler sprocket 48 suitably journaled on the transverse angle bar 12' and arranged in line with, but to the right of the idler sprockets 45; thence generally horizontally between the staggered sprockets 44 and 45 in driving engagement therewith; and finally around a driven sprocket 49 on the left of the cooler. The various sprockets 42, 46, 48, 44, 45 and 49 have parallel axes of rotation and are arranged in the same vertical transverse plane. As viewed in Fig. 3 the motor 40 rotates the drive sprocket 42 in a counterclockwise direction thereby moving the chain 43 in the direction of the arrow shown which in turn rotates the driven sprockets 44 and their rollers R' in a clockwise direction.

The driven sprocket 49 is fast to one end of an elongated shaft 50 which exends longitudinally the full length of the tank 15 and is arranged on the exterior thereof, this shaft 50 being suitably journaled in longitudinally spaced bearings 51 suitably mounted on the channel 10. The outer ends of the roller shafts 28 are each provided with a sprocket fast thereto as is also the corresponding end of the shaft 50 and an endless chain 52 passes around these sprockets in operative engagement therewith. With the shaft 50 rotating in a counterclockwise direction the roller shafts 28 and the respective rollers R are also rotatively driven in a counterclockwise direction as viewed in Fig. 4.

It may be desirable to spray the exposed portions of the spinning cans with heat exchange liquid as they travel along the guideways G and G'. In the illustrated form of the invention an overhead cold water spray system is provided which is shown as including a manifold pipe 53, a plurality of branch lines or pipes 54 and a plurality of spray nozzles 55 mounted on each branch line. The manifold pipe 53 extends longitudinally along the top of the longitudinal angle bar 23", one end of this manifold pipe being capped and the other end thereof adapted for connection to any suitable source of cold water (not shown). The branch lines 54 are connected to the pipe manifold 53 at spaced intervals and project horizontally inwardly therefrom across the top of the tank 15, the free ends of these lines being capped and supported on the longitudinal angle bar 23. Each branch line 54 is shown as provided with four of the spray nozzles 55 for directing jets or sprays of cold water downwardly into impingement with the exposed portions of the cans. The level of liquid in the tank 15 is shown, as maintained by an overflow pipe 56 projecting outwardly from the side wall 18 of the tank. As illustrated in Fig. 4 the level of the body of liquid in the tank 15 is such that the cans C are substantially half immersed in the liquid with the exposed upper half of the cans being subjected to the sprays discharged by the nozzles 55. With the cans C spinning rapidly and partly immersed in the cold water in the tank 15 and also being subjected to the cold water sprays, the contents of cans are rapidly and uniformly cooled to the desired temperature.

While the cans are shown as being partially immersed in the body of cold water in the tank 15 and also being subjected to sprays of cold water from above, it will be understood that the cans can be either completely immersed or subjected only to sprays.

Any suitable means can be employed for feeding the cans endwise into the guideways G. As shown, such means comprise an endless conveyer belt 58 having an upper stretch arranged slightly above the upper transverse edge of the end wall 19 of the tank 15 and moving toward this end wall. The conveyer belt 58 passes around a supporting roll 59 arranged adjacent the end wall 19. A pair of guide rails 60 is suitably arranged above the conveyer belt 58 for guiding a line of cans arranged end to end toward a feed chute 61 adjacent the outer end of each guideway G. Each feed chute 61 is suitably mounted on the upper edge of the end wall 19 and inclines downwardly toward the entrance to its respective guideway G. A stationary transfer plate 62 is arranged between the roll 59 and the outer ends of the feed chutes 61 for supporting the cans as they leave the conveyer belt 58 and enter the feed chutes. Thus the conveyer belt 58 conveys a line of cans between each pair of guide rails 60 toward the tank 15, the line of cans moving across the transfer plate 62 and sliding down the corresponding feed chute 61 into the outer end of the corresponding guideway G.

Any suitable means can be employed for removing the lines of cans C from each of the guideways G'. As shown, such means comprise an upwardly and outwardly inclined guide trough 63 suitably mounted on the upper transverse edge of the end wall 20 opposite the outer end of each guideway G'. Cans are pushed up these guide troughs 63 by succeeding cans.

A feature of the invention resides in the means provided for conveying the cans away from the cooler upon leaving the tank 15. After each can has been pushed out of its guide trough 63 by the succeeding cans, the can is permitted to drop so that its leading end engages a resilient pad maintained at such an angle as to cause the can to bounce in proper position into the inlet of a can conveying device represented generally by the numeral 64. For this purpose a bar 65 is shown as arranged below and outwardly of the discharge ends of the guide troughs 63 and is supported in a transversely horizontal and upwardly and outwardly tilted position by a plurality of support members 66. A support member 66 is arranged under each trough 63 and is shown as including a horizontal arm 67 welded to the transverse angle bar 25', an intermediate part 68 channel shaped in cross section and inclining downwardly and outwardly from the outer end of its arm 67, and an upwardly and outwardly inclining step 69 on the lower end of its intermediate part 68. The steps 69 of the various support members 66 support the flat bar 65 which on its upper face is provided with a strip of resilient material 70 such as rubber suitably secured thereto.

Each can conveying device 64 is shown as comprising a lower strap 71, and an upper strap 72 and a pair of side straps 73 arranged on each lateral side of the straps 71 and 72. These straps are arranged in spaced relation to one another to define a course of travel or confined guideway for the cans passing between the guide surfaces of these straps. A collar 74 surrounds the straps 71, 72 and 73 and is secured to these straps as by welding to maintain them in their proper relative positions. The ends of the side straps 73 are secured as by welding to the end wall 20 of the tank 15. Between the collar 74 and the tank 15 the end of the lower strap 71 is bent downwardly and its extremity is welded to the underside of the step 69 and the end portion of the upper strap 65 is bent upwardly to form a guide finger 72'. From the collar 74 the straps 71, 72 and 73 incline downwardly and outwardly with respect to the tank 15 and gradually twist through an angle of 90 degrees while maintaining their relative positions to provide a can twist.

As each can is pushed off the discharge end of its guide trough 63 the can tips and drops by gravity with its leading end facing downwardly. The angularity of the resilient strip 70 is such that when the leading end of the falling can strikes this resilient strip the can is caused to bounce in a generally upright position into the inlet of the can conveying device 64 adjacent the collar 74 thereof, the guide finger 72' assisting in insuring the proper entry of the can. The impetus of the bounced can is sufficient to carry the can onward through the restricted passage of the device along the downward slope of this passage. As the can encounters and passes the twisted straps 71, 72 and 73 it is gradually turned to a horizontal rolling position. The can conveying device 64 can lead to any suitable place, such as a labeling machine.

In commercial use the can cooler can be placed directly in the production line to receive the cans from the sealer (not shown) and to deliver the cooled cans to a labeler (not shown). With this set up assumed, the sealed cans containing preheated fruit juice and discharged by the sealer are placed on the upper stretch of the endless conveyor belt 58 between adjacent pairs of the guide rails 60 with the axes of the cans arranged horizontally and parallel to the direction of movement of the belt 58. The four lines or processions of cans so formed are continuously moved toward the tank 15.

When the cooler is being used the motor 40 is running constantly to rotate the rollers R in a counterclockwise direction, as viewed in Fig. 4, and the rollers R in a clockwise direction.

The cans in each of the four lines successively pass over the transfer plate 62 onto the upper end of the corresponding feed chute 61 and slide down this chute into the corresponding guideway G. As each can enters this guideway G it drops into the cold water in the tank 15 until it engages the rotating roller R. This frictional engagement between the roller and can causes the can to spin about its axis and move along the guideway G, being guided by the guide bars 32 during this longitudinal travel. When each can successively reaches the end of its driving roller R it is pushed by its succeeding cans across the stationary guide 39 and onto the corresponding roller R'. Thus the can enters the corresponding guideway G' and since the roller R' is rotating opposite to the roller R the can is rotated in a reverse direction. However the inclination of the guide bars 32' on opposite sides of the can is also reversed so that the relationship between these guide bars and the roller R' causes the cans to move in the same axial direction.

As the lines of cans travel relatively slowly from one end of the tank 15 to the opposite end thereof the cans spin in the body of cold water and are subjected to the sprays of cold water from the overhead nozzles 55. Such treatment brings all portions of the contents of the cans into contact with the inside surfaces of the walls of the cans and in heat exchange relation with the cold water contacting the outside surfaces of these walls. The body of cold water in the tank 15 is constantly replenished by the sprays of cold water discharged by the nozzles 55 and excess water drains from the tank through the drain pipe 56 thereby to maintain the cold temperature and level of the water in the tank. In this manner the contents of the cans are rapidly and uniformly cooled to the desired temperature.

As each can approaches the outer end of its roller R' the can is pushed by succeeding cans upwardly onto its guide trough 63. The can stops rotating and when it reaches the discharge end of its guide trough 63 the can tips and falls. The leading end of the falling can forcibly strikes the resilient pad 70 which causes the can to bounce upwardly toward the inlet of the can conveying device 64, the can entering this device with its axis arranged generally vertically but leaning forwardly in the direction of movement of the can. The can passes through the device 64 and is turned or twisted thereby to lie with its axis in a horizontal position in which position the can rolls toward the labeler (not shown). Bouncing of the cans on the resilient pad 70 tends to shake off any liquid clinging to the surface of the cans.

It is well known that conventional sealed cans have a continuous circumferential bead at each end which projects radially outwardly a slight amount. These beads on the ends of the cans are the parts of the cans which generally engage the rollers R and R'. The expression "closed cylindrical containers" as used in the following claims and all reference in these claims to the peripheral engagement of these containers are intended to comprehend commercial cans having such beads and also peripheral engagement of these beads.

It is not intended to limit the invention to the cooling of the contents of cans since the invention can be practiced to heat the contents of cans as well by employing a suitable heat exchange medium to effect this result. In this connection, the heat exchange medium whether for cooling or heating can be either a liquid, gas or vapor and can be employed under vacuum, atmospheric or pressure conditions, the apparatus being suitably designed for the particular application of the invention. Further, the invention is intended to comprehend apparatus adapted to treat only one line of cans or as many lines of cans simultaneously as desired.

We claim:

1. Apparatus for treating the contents of closed cylindrical containers, comprising a moving surface arranged to frictionally engage the peripheries of said containers, means arranged to maintain said containers on said moving surface with their axes at an angle to the direction of movement of said moving surface such that a major component of the force imparted to the containers due to said frictional engagement with said moving surface is normal to said axes and a minor component of said force is parallel with said axes whereby said containers are rotated and moved axially, and means providing a heat exchange zone through which said containers are so moved.

2. Apparatus for treating the contents of closed cylindrical containers, comprising an elongated roller having a cylindrical periphery arranged to frictionally engage the peripheries of a procession of said containers, means arranged to rotate said roller, guide means arranged to maintain said containers on said rotating roller with their axes at a slight angle to the axis of said roller whereby said containers are rotated and moved along said roller, and means providing a heat exchange zone through which said containers are moved.

3. Apparatus for treating comestibles in closed cylindrical containers comprising an elongated roller, means arranged to rotate said roller, guide means arranged above said roller to guide a line of said containers arranged end to end and in peripheral frictional engagement with said roller at a slight angle to the axis of said roller whereby said containers are rotated and moved along said roller, and means providing a heat exchange zone through which said containers are moved.

4. Apparatus for treating comestibles in closed cylindrical containers, comprising an elongated roller, means arranged to rotate said roller, spaced and parallel guide members arranged above said roller and extending at a slight angle to the axis of said roller and adapted to guide therebetween a line of said containers arranged end to end with their peripheries in driving engagement with said roller whereby said containers are rotated and moved longitudinally along said roller, and means providing a heat exchange zone through which said containers are moved.

5. Apparatus for treating comestibles in closed cylindrical containers, comprising an elongated roller arranged for rotation about a generally horizontal axis, means arranged to rotate said roller, horizontally spaced and parallel guide members horizontally arranged above said roller and extending at a slight angle to the axis of said roller and adapted to guide between them a line of said containers arranged end to end with their peripheries in driving engagement with said roller whereby said containers are rotated and moved longitudinally along said roller, and means providing a heat exchange zone through which said containers are moved.

6. Apparatus for treating comestibles in closed cylindrical containers, comprising an elongated roller arranged for rotation, means arranged to rotate said roller, transversely spaced guide surfaces arranged above said roller to provide therebetween a guideway having its longitudinal axis extending at a slight angle to the axis of said roller whereby a procession of said containers arranged end to end and introduced into said guideway into peripheral engagement with said roller are caused to spin about their axes and also move along said guideway, and means for subjecting the exteriors of said containers to a heat exchange medium while being so spun and moved.

7. Apparatus for treating comestibles in closed cylindrical containers, comprising an elongated roller having a cylindrical periphery arranged for rotation about a generally horizontal axis, means arranged to rotate said roller, transversely spaced guide surfaces arranged above said roller to provide therebetween a guideway having its longitudinal axis intersecting a vertical projection of the said roller axis and said longitudinal axis also extending at a slight horizontal angle to said roller axis whereby a procession of said containers arranged end to end and introduced into said guideway into peripheral engagement with said roller are caused to spin about their axes and also move along said guideway, and means for subjecting the exteriors of said container to a heat exchange medium while being so spun and moved.

8. Apparatus for treating comestibles in closed cylindrical containers, comprising a tank, an elongated roller journaled in said tank, means arranged to rotate said roller, means arranged to maintain a procession of said containers on said roller in peripheral engagement therewith and with the axes of said containers arranged at a slight angle to the axis of said roller whereby said containers are rotated and moved longitudinally along said roller, and said tank containing a body of heat exchange liquid having a level such that said containers are at least partially immersed in said liquid.

9. Apparatus for treating comestibles in closed cylindrical containers, comprising a tank, an elongated roller journaled in said tank, means arranged to rotate said roller, means arranged to maintain a procession of said containers on said roller in peripheral engagement therewith and with the axes of said containers arranged at a slight angle to the axis of said roller whereby said containers are rotated and moved longitudinally along said roller, said tank containing a body of heat exchange liquid having a level such that said containers are at least partially immersed in said liquid, and means arranged to discharge sprays of heat exchange liquid downwardly into impingement with the exposed portions of said containers.

10. Apparatus for treating comestibles in closed cylindrical containers, comprising a tank, an elongated roller journaled in said tank, means arranged to rotate said roller, means arranged to maintain a procession of said containers on said roller in peripheral engagement therewith and with the axes of said containers arranged at a slight angle to the axis of said roller whereby said containers are rotated and moved longitudinally along said roller, said tank containing a body of heat exchange liquid having a level such that said containers are at least partially immersed in said liquid, means arranged to introduce said procession of said containers into said tank adjacent one end of said roller, and means arranged to remove said procession of said containers from said tank adjacent the other end of said roller.

11. Apparatus for treating comestibles in closed cylindrical containers, comprising a tank an elongated roller journaled on said tank for rotation about a generally horizontal axis and having a cylindrical periphery, means arranged to rotate said roller, guide bars arranged generally horizontally above said roller at a slight angle to the axis thereof and horizontally spaced to provide a guideway between said bars, said guideway being adapted to receive a line of said containers in end to end arrangement and with their axes arranged longitudinally of said guideway and with their peripheries in frictional engagement with said cylindrical periphery of said rotating roller whereby said containers are spun about their said axes and also moved longitudinally along said guideway, said tank containing a body of heat exchange liquid having a level such that said containers when in said guideway are at least partially immersed in said liquid, means arranged to discharge sprays of heat exchange liquid to impinge against the exposed portions of said containers when in said guideway, means arranged to introduce said line of containers into said guideway adjacent one end of said roller, and means arranged to remove said line of containers from said guideway adjacent the other end of said roller.

12. Apparatus for treating comestibles in closed cylindrical containers, comprising a first elongated roller journaled for rotation about a generally horizontal axis, a second elongated roller journaled in juxtaposition and coaxial with said first roller, said rollers having concentric cylindrical peripheries, means arranged to rotate said rollers in opposite directions, transversely spaced guide members arranged horizontally above each of said rollers at a slight angle to the axis of the respective one of said rollers to provide jointly therewith a continuous canway for a procession of said containers arranged end to end in peripheral engagement with said rollers, the angularity of said guide members above said first roller being in reversed relation to the angularity of said guide members above said second roller whereby the containers in said procession when engaging said first roller are spun in one direction about their axes and moved axially toward said second roller and when engaging said second roller are spun in a direction opposite to said one direction and moved axially in the same direction, and means providing a heat exchange zone through which said containers are moved.

13. Apparatus for treating comestibles in closed cylindrical containers, comprising a tank a first elongated roller journaled in said tank for rotation about a generally horizontal axis, a second elongated roller journaled in said tank in juxtaposition and coaxial with said first roller, said rollers having concentric cylindrical peripheries, means arranged to rotate said rollers in opposite directions, transversely spaced guide members arranged horizontally above each of said rollers at a slight angle to the axis of the respective one of said rollers to provide jointly therewith a continuous canway for a procession of said containers arranged end to end in peripheral engagement with said rollers, the angularity of said guide members above said first roller being in reversed relation to the angularity of said guide members above said second roller whereby the containers in said procession when engaging said first roller are spun in one direction about their axes and moved axially toward said second roller and when engaging said second roller are spun in a direction opposite to said one direction and moved axially in the same direction, said tank containing a body of heat exchange liquid contacting said containers in said continuous canway, means arranged to introduce said procession containers into said canway adjacent the outer end of said first roller, and means arrranged to remove said procession of containers from said canway adjacent the outer end of said second roller.

14. Apparatus for treating comestibles in closed cylindrical containers, comprising a tank, means providing a heat exchange zone in said tank, means arranged to introduce a line of said containers arranged end to end into said tank, means arranged to convey said line of containers through said heat exchange zone, and means arranged to remove said line of containers from said tank, comprising a guide member for guiding successively each of said containers out of said tank and permitting each of said containers to drop by gravity with one end facing downwardly, resilient means arranged below said guide member and adapted to be engaged by the downwardly facing end of each of said containers dropped from said guide member and means providing a confined guideway for said containers and having an inlet for receiving said containers in a generally upright position, said inlet being arranged adjacent said resilient means, the disposition of said resilient means being such as to cause each of said containers to bounce in a generally upright position into said inlet.

15. Apparatus for treating comestibles in closed cylindrical containers, comprising a tank, means providing a heat exchange zone in said tank, means arranged to introduce a line of said containers arranged end to end into said tank, means arranged to convey said line of containers through said heat exchange zone, and means arranged to remove said line of containers from said tank, comprising a guide trough arranged to guide successively each of said containers out of said tank and permitting each of said containers to tip on the discharge end of said guide trough and drop by gravity with the leading end of the tipped container facing downwardly, a resilient pad arranged below and slightly outwardly of said discharge end of said guide trough and adapted to be struck by the said leading end of each container dropped from said guide trough, means providing a confined guideway for said containers and having an inlet for receiving said containers in a generally upright position, said inlet being arranged adjacent said resilient pad and the portion of said confined guideway adjacent said inlet thereof extending downwardly away from said inlet and means supporting said resilient pad with its container engaging surface disposed at an angle such as to cause each of said containers to bounce in a generally upright position into said inlet.

16. Apparatus for treating comestibles in closed cylindrical containers, comprising a tank containing a body of heat exchange liquid, a plurality of elongated rollers immersed in said body of liquid and arranged side by side in horizontally spaced and parallel relation to one another and journaled for rotation about generally horizontal axes, means arranged to rotate said rollers in the same direction, a companion roller immersed in said body of liquid and arranged coaxially opposite one end of each of said first mentioned rollers, means arranged to rotate said companion rollers in the same direction but opposite to said first mentioned rollers, parallel guide bars arranged horizontally above said first mentioned rollers at a slight angle to the axes thereof and providing a guideway extending across each of said first mentioned rollers, parallel guide bars arranged horizontally above said companion rollers at a slight angle to the axes thereof and providing a guideway extending across each of said companion rollers, the adjacent ends of each pair of guideways for one of said first mentioned rollers and its said companion roller being arranged opposite each other, means arranged to introduce a line of said containers in end to end arrangement into the outer end of each of said guideways for said first mentioned rollers, and means arranged to remove each of said lines of containers from the outer end of each of said guideways for said companion rollers, the said lines of containers being peripherally engaged by said rollers to spin said containers and move them axially through said guideways in heat exchange relation with said liquid.

GORDON A. CHISSOM.
ALBERT W. GORDON.

REFERENCES CITED

The following references are of record in the file of this patent:

UNITED STATES PATENTS

| Number | Name | Date |
|---|---|---|
| 642,452 | Hull | Jan. 30, 1900 |
| 1,250,244 | Thompson | Dec. 18, 1917 |
| 1,851,820 | Dunbar | Mar. 29, 1932 |
| 2,059,724 | Carlson | Nov. 3, 1936 |
| 2,284,269 | Eberts | May 26, 1942 |
| 2,295,273 | Thompson | Sept. 8, 1942 |